United States Patent [19]

Meckel et al.

[11] Patent Number: 4,946,535
[45] Date of Patent: Aug. 7, 1990

[54] POLYESTER POLYURETHANES CONTAINING HYDROXYL END GROUPS AND THEIR USE AS ADHESIVES

[75] Inventors: Walter Meckel, Neuss; Horst Müller-Albrecht, Cologne; Manfred Dollhausen, Odenthal, all of Fed. Rep. of Germany

[73] Assignee: Bayer Aktiengesellschaft, Leverkusen, Fed. Rep. of Germany

[21] Appl. No.: 275,253

[22] Filed: Nov. 23, 1988

[30] Foreign Application Priority Data

Jan. 25, 1985 [DE] Fed. Rep. of Germany ....... 3502379

[51] Int. Cl.$^5$ ................................. C09J 3/14
[52] U.S. Cl. .................... 156/331.7; 12/142 F; 12/142 T; 36/19.5; 36/DIG. 1; 156/182; 428/423.4; 528/83
[58] Field of Search ............. 156/331.7, 182; 12/142 F, 142 T; 36/19.5, DIG. 1; 428/428.4; 528/83

[56] References Cited

U.S. PATENT DOCUMENTS

| 3,528,948 | 9/1970 | Reuter | 528/83 |
|---|---|---|---|
| 3,718,518 | 2/1973 | Bock et al. | 156/331.7 |
| 4,051,111 | 9/1977 | Holloway | 260/75 |

FOREIGN PATENT DOCUMENTS

| 2626132 | 12/1977 | Fed. Rep. of Germany . | |
|---|---|---|---|
| 1081705 | 8/1967 | United Kingdom | 156/331.7 |
| 1191260 | 5/1970 | United Kingdom . | |
| 1554102 | 10/1979 | United Kingdom . | |

OTHER PUBLICATIONS

C. Hepburn, "Polyurethane Elastomers", Applied Science Publishers, N.Y., 1982.

*Primary Examiner*—John J. Gallagher
*Attorney, Agent, or Firm*—Joseph C. Gil; Aron Preis

[57] ABSTRACT

This invention relates to new, substantially linear polyester polyurethanes containing hydroxyl end groups, based on selected starting materials, and their use as adhesives or for the production of adhesives.

7 Claims, No Drawings

POLYESTER POLYURETHANES CONTAINING HYDROXYL END GROUPS AND THEIR USE AS ADHESIVES

This application is a continuation of application Ser. No. 817,376 filed Jan. 9, 1986, now abandoned.

FIELD OF THE INVENTION

The invention is directed to polyester polyurethanes and more particularly, to adhesives comprising substantially linear polyester polyurethanes.

BACKGROUND OF THE INVENTION

This invention relates to new, substantially linear polyester polyurethanes containing hydroxyl end groups, based on selected starting materials, and their use as adhesives or for the production of adhesives.

The use of substantially linear polyester polyurethanes containing hydroxyl end groups as adhesives for bonding a wide variety of materials such as PVC, natural or synthetic types of rubber containing plasticizer to materials of the same type or to other materials is known and has been described, for example, in DE-PS No. 1,256,822 and in DE-PS No. 1,930,336.

These dihydroxy polyester polyurethanes based on crystalline dihydroxy polyesters generally have a molecular weight of from 800 to 4,000, optionally low molecular weight chain lengthening agents and diisocyanates do not, however, fulfill all the requirements of modern jointing and adhesive technology in spite of their wide use in the adhesives industry.

Manufacturing methods for fashion shoes for example, require the layer of adhesive applied to the shoe soles to be rendered sufficiently thermoplastic by a brief heat shock (shock activation) to enable it to be permanently bonded to the non-activated adhesive on the uppers. For a problem-free manufacturing process, it is important that this contact adhesive time (i.e. the period of time during which the adhesive layer maintains its adhesive properties) should be sufficiently long after the shock activation. This aim has been achieved in the past by developing highly thermoplastic dihydroxy polyurethanes which although have a sufficient contact adhesive time after shock activation also have the serious disadvantage that, because of their insufficient initial strength, they require long molding times in the press, which requirement prevents efficient mass production.

SUMMARY OF THE INVENTION

It is therefore an object of the present invention to provide new adhesives based on substantially linear polyester polyurethanes which would satisfy the practical requirements for sufficiently long contact adhesive time after heat shock activation and a high initial and final strength of the bonds obtained.

This objective is met by the polyester polyurethanes according to the invention described below.

The invention is directed to substantially linear polyester polyurethanes containing hydroxyl end groups, prepared by reacting (a) polyester diols having a molecular weight above 600 and (b) organic diisocyanates, optionally in the presence of (c) diols in the molecular weight range of from 62 to 600 as chain lengthening agents, at an equivalent ratio of hydroxyl groups of components (a) and (c) to isocyanate groups of component (b) in the range of from 1:0.9 to 1:0.999, the reaction being characterized in that at least 80% by weight of component a) consists of polyester diols having a molecular weight of from 4,000 to 6,000 based on (i) adipic acid and (ii) a mixture of 1,4-dihydroxy butane and 1,6-dihydroxy hexane in a molar ratio of from 4:1 to 1:4.

An additional object of the invention is the use of these polyester polyurethanes as adhesives, or for the production of adhesives, for bonding plastics to plastics or to other substrates.

DETAILED DESCRIPTION OF THE INVENTION

The starting materials used for the preparation of the polyester polyurethanes according to the invention include (a) certain dihydroxy polyesters, (b) organic diisocyanates, and optionally, (c) low molecular weight diols as chain lengthening agents.

At least 80% by weight of component a) which is an essential component for this invention consists of polyester diols having a molecular weight (calculated from their hydroxyl number) from 4,000 to 6,000, based on (i) adipic acid and (ii) a mixture of 1,4-dihydroxy butane and 1,6-dihydroxy hexane in a molar ratio of diols of from 4:1 to 1:4, preferably from 7:3 to 1:2. These polyester diols are prepared by known methods such as by reacting adipic acid with an excess of diol mixture of the stated molecular weight at 100° C. to 220° C. until the acid number of the reaction mixture has fallen below two.

In addition to the polyester diols, component (a) may contain up to 20% by weight of other polyester diols having a molecular weight above 600 (calculated from their hydroxyl number). These additional polyester diols may have a molecular weight of 1,000 to 4,000 and may be obtained by the known methods such as by reacting alkane dicarboxylic acids, preferably having at least 6 carbon atoms, with alkane diols preferably having at least 4 carbon atoms. Examples of suitable dicarboxylic acids are adipic acid, pimelic acid, suberic acid, azelaic acid and sebacic acid, and examples of suitable diols are 1,4-dihydroxy butane, 1,5-dihydroxy pentane and 1,6-dihydroxy hexane. Dihydroxy polycarbonates within the above mentioned molecular weight range, in particular those based on 1,6-dihydroxy hexane, and esterification products of straight chained hydroxy alkane mono-carboxylic acids containing hydroxyl end groups and having at least 5 carbon atoms, e.g. ε-hydroxy carboxylic acid or the corresponding lactone polymers containing hydroxyl end groups may also be present in minor quantities in component (a). Preferably, however component (a) consists entirely of the above-mentioned polyester diols based on adipic acid and a mixture of 1,4-dihydroxy butane and 1,6-dihydroxy hexane.

In preparing the polyester polyurethanes according to the invention, low molecular weight chain lengthening agents containing two hydroxyl end groups may optionally be included as component (c). These chain lengthening agents are generally divalent alcohols having a molecular weight of 62 to 600, preferably 62 to 118.

These chain lengthening agents are preferably alkane diols which carry hydroxyl end groups and have from 2 to 8, preferably 2 to 6 and in particular 4 to 6 carbon atoms, e.g. 1,2-dihydroxy ethane, 1,3-dihydroxy propane, 1,4-dihydroxy butane, 1,5-dihydroxy pentane, 1,6-dihydroxy hexane or any mixtures of these diols. Component (c) may also include ester diols within the above mentioned molecular weight range, e.g. terephthalic acid-bis-2-hydroxy ethyl ester, ether diols, e.g. 4,4'-bis-(2-hydroxyethoxy)-diphenyl propane-(2,2), or diols containing carboxyl groups, such as dimethylol propionic acid and/or diols containing sulphonate groups such as propoxylated products of addition of sodium hydrogen sulphite to 1,4-dihydroxy-but-2-ene and/or diols containing quaternary ammonium groups. Examples of suitable ionically modified or carboxyl group-containing diols of the type mentioned above may be found in DE-OS No. 2,734,102 which is incorporated herein by reference.

Component (c), if used at all, is added in a quantity of up to 200 hydroxy equivalents percent, preferably up to 100 and most preferably up to 70 hydroxy equivalents percent, based on component (a) In particular, when mixtures of alkane diols of the type mentioned above are used as component (c) the chain lengthening agents may be used in an amount of from 100 to 200 hydroxy equivalents percent, based on component (a). If only one chain lengthening agent of the type exemplified above is used, the quantity of component (c) is at most, 100 hydroxy equivalents percent, based on component (a). Component (c) is most preferably used in a quantity of from 30 to 70 hydroxy equivalents percent, based on component (a).

Component (b) consists of known organic diisocyanates, in particular those of the formula $$Q(NCO)_2$$

wherein Q represents an aliphatic hydrocarbon group having 4 to 10, preferably 6 carbon atoms, a cycloaliphatic hydrocarbon group having 5 to 15 carbon atoms, preferably 6 to 13 carbon atoms, an aromatic hydrocarbon group having 6 to 15, preferably 7 to 13 carbon atoms or an araliphatic hydrocarbon group having 8 carbon atoms.

The following are examples of suitable diisocyanates: 1,6-diisocyanatohexane, 1,4-diisocyanatocyclohexane, 1-isocyanato-3-isocyanatomethyl-3,5,5-trimethylcyclohexane, 2,4- and optionally 2,6-diisocyanatotoluene, 4,4'-diisocyanato-diphenyl methane, 4,4'-diisocyanato-diphenyl propane-(2,2) and any mixtures of such diisocyanates. 1,6-diisocyanatohexane and 4,4'-diisocyanatodiphenyl methane are particularly preferred as component (b).

In addition to the starting components (a), (b) and optionally (c), the starting materials for the preparation of the polyester polyurethanes according to the invention may also include minor quantities, i.e. up to 5 equivalent percent based on components (a) to (c), of components having a functionality of 3 or more which have a branching action, e.g. alcohols such as trimethylol propane or polyisocyanates, since a slight branching of the polyester polyurethanes according to the invention may often be an advantage.

The polyester polyurethanes according to the invention are preferably prepared by the one-pot process, i.e. by the reaction of a mixture of components (a) and (c) with the isocyanate component (b), where the NCO-/OH molar ratio is 0.9:1 to 0.999:1 resulting in that the end products invariably carry terminal hydroxyl groups. The reaction is preferably carried out in the absence of solvents at 50° C. to 200° C., most preferably at 80° C. to 150° C. It may, however, be carried out in the presence of inert solvents, e.g. toluene, methyl ethyl ketone, ethyl acetate, dimethyl formamide or their mixtures.

The production may also be carried out according to the prepolymer principle whereby, for example, the polyester component (a) may be reacted with the diisocyanate component (b) at 50° C. to 150° C., at an NCO-/OH molar ratio above 1:1, to produce an isocyanate prepolymer which may subsequently be lengthened by component (c) at 80° to 200° C. Both the preparation of the prepolymer and the chain lengthening reaction may be carried out either in the absence or in the presence of solvents. Variations of these methods could of course, be employed. For example, one or two of the above mentioned diols (c) may be included in the preparation of the isocyanate prepolymer, the remaining diols (c) is then being added during the chain lengthening reaction. The reactions may be carried out discontinuously in a stirrer vessel or continuously, e.g. in a reaction extruder or a mixing head. The possibility of using a catalyst is of course, not excluded.

The products according to this invention are valuable adhesives or adhesive raw materials suitable for bonding any substrates but particularly for bonding soft PVC to soft PVC or to other materials. For their application according to the invention, the products obtained by the process according to the invention may be worked up in the form of solutions in suitable solvents, for example of the type already mentioned above, or they may be worked up solvent free. The products of the process according to the invention are preferably used in the form of 10 to 40% by weight solutions in polar solvents such as, acetone or methyl ethyl ketone. The viscosity of these adhesive solutions may be adapted to the special requirements of the bonding process or to the materials which are to be bonded by varying the hydroxyl polyurethane content. The solutions of the hydroxyl polyurethanes according to the invention are advantageously prepared by simply dissolving the polyurethanes in the polar solvents at room temperature or at a moderately elevated temperature. If the hydroxyl polyurethanes are prepared in solution, any nonpolar solvent used in the course of the preparation may first be drawn off or the quantity of polar solvent required for the particular purpose may be added to the system without first removing the nonpolar solvent. When polar solvents have been used in the course of preparation of the polyurethanes, the resulting solutions are ready for use.

If the adhesives described are required to have special properties, natural or synthetic resins such as phenol resins, ketone resins, colophony derivatives, phthalate resins or acetyl- or nitrocellulose or other substances, e.g. silicate fillers may be added to them. Crosslinking agents such as polyisocyanates of a functionality of three or more e.g. phosphoric acid-tris-isocyantophenyl ester, tris-(isocyantohexyl)-isocyanurate or tris-(isocyanato-hexyl)-biuret may also be added when exceptionally heat resistant bonds are required.

The products according to the invention may also be worked up in the absence of solvents. In either case, the solution or the solvent-free adhesive is applied to the surfaces to be bonded, for example by means of a roller, brush, spatula, spray gun or other device, optionally after first preparing the surfaces by roughening them or by some other means. The coats of the applied adhesive are heated, for example, to about 50° C. to 150° C., preferably about 55° C. to 100° C., to evaporate off most of the contained solvent, if any, to activate the adhesive.

The materials may then be joined together by pressing either immediately or after an interim period of storage followed by one-sided shock activation, the adhesives according to the invention being particularly suitable for the latter method.

As an alternative method, a liquid plastics material, e.g. a vinyl chloride polymer containing plasticizer, heated to a temperature of 120° to 200° C., may be applied by the injection molding process to the surface of a material coated with a partially dried layer of adhesive.

The products according to the invention may be used for bonding a wide variety of materials such as paper, cardboard, wood, metal and leather to produce high strength bonds. They are particularly suitable for bonding all types of plastics to plastics or to other materials, in particular for bonding homopolymers or copolymers of vinyl chloride containing plasticizer, above all for bonding shoe soles made of these materials to uppers of leather or synthetic leather.

The products according to the invention are also suitable for use as coatings for various substrates.

The present invention is further illustrated but is not intended to be limited by the following examples in which all parts and percentages are by weight unless otherwise specified.

EXAMPLES

Preparation of the polyester polyurethanes

The polyester diols (column 1) and diols (column 2) listed in the table are mixed together and dehydrated in a water jet vacuum at 100° C. for 1 hour.

The polyisocyanates (column 3) are then added at 120° C. The reaction mixture is stirred for about 2 minutes and the temperature may rise to 140° C. The hot melt is poured into TEFLON ® dishes and then kept at 110° C. for 15 hours.

The products dissolved to form 15% solutions in methyl ethyl ketone have a viscosity of 1,000 to 1,200 mPas at 23° C.

Preparation of the bonds to determine the initial strength

The material used is a 4 mm thick PVC material composed of 70 parts by weight of polyvinyl chloride (K value 80), 30 parts by weight of dioctyl phthalate as plasticizer and 5 parts by weight of epoxidized soya bean oil and 1.2 parts by weight of barium-cadmium laurate. Before the adhesives are applied (for this purpose 20% by weight solutions in methyl ethyl ketone are used), the surfaces of the strips of material 15 cm in length and 3 cm in width which are to be bonded are thoroughly roughened with a sanding belt of grain 40 and then freed from the sanding dust. After application of the adhesive thereto the strips of shoe sole material are stored open for one day at room temperature and then activated for 4 seconds by heating them to 80° C. in a Funck activating apparatus Model A 1000. The strips of shoe upper material covered with adhesive are not activated and are only stored open for 30 minutes at room temperature and then immediately joined to a strip carrying the activated film of adhesive and pressed to this strip. All the activated films of adhesive are applied within 10 seconds after their removal from the activating apparatus and a pressure of 0.4 N/mm is applied to the bonds for 10 seconds. After the application of pressure, the samples are clamped into a tension testing machine within 1 minute. The two ends of the samples are then pulled apart at the rate of 100 mm/min. The results obtained for the initial strength are shown in column 4 of the table.

Determination of the contact adhesive time after activation by heat shock

The material used as a sample is a commercial 4 mm thick rubber material of acrylonitrile-butadiene rubber (acrylonitrile content 33%, deformation hardness 700 according to DIN 53514) containing about 31% of silicate filler (Shore hardness A of rubber material: 85 according to DIN 53505).

Strips 4 cm in length and 2 cm in width are used for the test. The strips of shoe sole material are stored open at room temperature for one day after the adhesive has been applied and are then activated for 3 seconds in the Funck activating apparatus, Model A 1000 (70° C.).

The strips of the shoe upper material coated with adhesive are not activated but merely stored open at room temperature for 30 minutes and then immediately covered cross way with a strip covered with an activated film of adhesive and then put under a weight of 10 N for 5 seconds. After the application of pressure, the bond strength of the films of adhesive is assessed by pulling the strips apart by hand. Over a period of up to 10 minutes, additional samples are tested at intervals of 30 seconds.

The table (column 5) shows the results of contact adhesive time. Examples I to VII(a) describe polyester polyurethanes according to the invention which have good initial bond strengths (column 4) and good contact adhesive times after the heat shock activation (column 5).

Examples VIII to X show that the polyurethanes based on mixed esters with lower molecular weights have a good contact adhesive time after heat shock activation but a low initial strength. Examples XI and XII show that the polyurethanes based on polyester diols in which only one diol is incorporated as the diol component have a good initial strength but a short contact adhesive time after the heat shock activation.

Legend

Polyesters

A Hydroxyl polyester of adipic acid and a mixture of butane-1,4-diol and hexane-1,6-diol in a molar ratio of 7:3. (MW 5000; acid number 1.1).

B Hydroxyl polyester of adipic acid and a mixture of butane-1,4-diol and hexane-1,6-diol in a molar ratio of 1:2. (MW 4500; acid number 1.0).

C Hydroxyl polyester of adipic acid and a mixture of butane-1,4-diol and hexane-1,6-diol in a molar ratio of 4:6. (MW 4500; acid number 1.1).

D Hydroxyl polyester of adipic acid and a mixture of butane-1,4-diol and hexane-1,6-diol in a molar ratio of 7:3. (MW 3500; acid number 1.0).

E Hydroxyl polyester to adipic acid and a mixture of butane-1,4-diol and hexane-1,6-diol in a molar ratio of 7:3. (MW 2000; acid number 0.9).

F Hydroxyl polyester of adipic acid and a mixture of butane-1,4-diol and hexane-1,6-diol in a molar ratio of 1:1. (MW 2000; acid number 1.1).

G Hydroxyl polyester of adipic acid and hexanediol (MW 2250; acid number 0.8).
H Hydroxyl polyester of adipic acid and hexane diol (MW 4000; acid number 0.9).

Glycols

M butane-1,4-diol
N hexane-1,6-diol
O 2,2-bis-(4-(2-hydroxy ethoxy)-phenyl)-propane
P propoxylated 2,2-bis-4-hydroxy phenyl propane, OH number 200

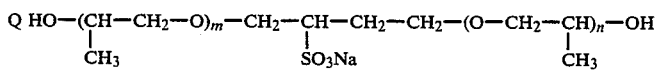

Q

°m+n~4, OH number 260
R dimethylol propionic acid.

Polyisocyanates

X 4,4'-diisocyanatodiphenyl methane
Y Hexamethylene diisocyanate
Z mixture of 65% of 2,4- and 35% of 2,6-tolylene diisocyanate.

TABLE

| | Example | | | | |
|---|---|---|---|---|---|
| | 1 Polyester | 2 Glycol | 3 Diisocyanate | 4 Initial Strength N/mm | 5 Contact adhesive time minutes |
| I. | 1 mol A | 0.5 mol M 0.5 mol N | 1.99 mol X | 2.1 | >10 |
| II. | 1 mol A | — | 0.995 mol Y | 2.6 | >10 |
| III. | 1 mol A | 0.4 mol O | 1.395 mol Y | 2.3 | >10 |
| IV. | 1 mol A | 0.4 mol P | 1.39 mol Y | 2.2 | >10 |
| V. | 1 mol A | 0.4 mol N 0.4 mol O | 1.79 mol Y | 2.7 | >10 |
| VI. | 1 mol A | 0.2 mol Q 0.1 mol R | 1.29 mol Y | 2.1 | >10 |
| VII. | 1 mol B | — | 0.995 mol X | 1.9 | >10 |
| VII(a) | 1 mol C | — | 0.995 mol X | 2.0 | >10 |
| VIII. | 1 mol D | — | 0.995 mol Y | 0.9 | >10 |
| IX. | 1 mol E | — | 0.995 mol Y | 0.6 | >10 |
| X. | 1 mol F | — | 0.995 mol Z | 0.5 | >10 |
| XI. | 1 mol G | 0.4 mol N | 1.39 mol X | 2.3 | 1 |
| XII. | 1 mol H | — | 0.995 mol X | 2.5 | <1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Substantially linear polyester polyurethane containing hydroxyl end groups, prepared by reacting
   (a) a polyester diol having a molecular weight above 600 and
   (b) an organic diisocyanate, optionally in the presence of
   (c) diols in the molecular weight range of from 62 to 600 as chain lengthening agents,
at an equivalent ratio of hydroxyl groups to isocyanate groups of from 1:0.9 to 1:0.999, and wherein at least 80% by weight of component (a) consists of a polyester diol having a molecular weight of from 4000 to 6000 based on (i) adipic acid and (ii) a mixture of 1,4-dihydroxy butane and 1,6-dihydroxy hexane in a molar ratio of from 4:1 to 1:4.

2. The polyester polyurethane of claim 1, wherein component (a) consists of 100% of a polyester diol having a molecular weight range of from 4000 to 6000 prepared from a mixture comprising 1,4-dihydroxy butane and 1,6-dihydroxy hexane in a molar ratio in the range of from 7:3 to 1:2.

3. The polyester polyurethane of claim 1 characterized in that component (b) comprises at least one member selected from the group consisting of 4,4'-diisocyanatodiphenyl methane and 1,6-diisocyanatohexane.

4. The polyester polyurethane of claim 1 wherein said (c) comprises at least one member selected from the group consisting of 1,2-dihydroxyethane, 1,3-dihydroxy propane, 1,4-dihydroxy butane, 1,5-dihydroxy pentane snd 1,6-dihydroxy hexane, said member being reacted in a quantity of up to 200 hydroxy equivalents percent, based on said component (a).

5. Adhesives comprising the polyester polyurethane of claim 1 and at least one member selected from the group consisting of natural resins, synthetic resins and silicate fillers.

6. A method for bonding plastics to leather substrates comprising applying the polyester polyurethane of claim 1 to the surfaces to be bonded and then contacting said surfaces.

7. The method of claim 6 wherein said plastics is a plasticizer containing homopolymer or copolymer of vinyl chloride.

* * * * *